US00RE33814E

United States Patent [19]

Bradley et al.

[11] E Patent Number: Re. 33,814

[45] Reissued Date of Patent: Feb. 4, 1992

[54] MANIFOLD INPUTS AND OUTPUTS FOR FURNACE REGENERATORS

[75] Inventors: Robert O. Bradley, Toledo, Ohio; Heywood J. Knighton, deceased, late of Grosse Pointe Park, Mich., by William R. Steitz, legal representative; Robert J. Naveaux, Perrysburg, Ohio

[73] Assignee: Toledo Engineering Co., Inc., Toledo, Ohio

[21] Appl. No.: 309,196

[22] Filed: Oct. 5, 1981

Related U.S. Patent Documents

Reissue of:

[64] Patent No.: 4,174,948
Issued: Nov. 20, 1979
Appl. No.: 883,696
Filed: Mar. 6, 1978

[51] Int. Cl.[5] ..... F27D 17/00; F28D 17/04

[52] U.S. Cl. ..... 432/181; 165/9.3; 165/9.4

[58] Field of Search ..... 165/9.3, 9.4; 432/180, 432/181, 182, 54

[56] References Cited

U.S. PATENT DOCUMENTS

| | | | |
|---|---|---|---|
| 199,164 | 1/1878 | Morgan | 432/165 |
| 274,320 | 3/1883 | Harper | 432/182 |
| 478,767 | 7/1892 | Smythe | 432/182 |
| 490,726 | 1/1893 | Stevenson | 165/9.3 |
| 535,030 | 3/1895 | Trautwein | 432/182 |
| 569,421 | 10/1896 | Lemaire | 432/70 |
| 824,723 | 7/1906 | Johnston | 432/195 |
| 860,888 | 7/1907 | Smith | 432/181 |
| 1,184,690 | 5/1916 | Landgrebe | 165/9.3 |
| 1,282,649 | 10/1918 | Stevens | 137/311 |
| 1,608,150 | 11/1926 | Westbury | 432/54 |
| 1,648,191 | 11/1927 | Pike | 432/181 |
| 1,653,507 | 12/1927 | Pike | 432/181 |
| 1,844,867 | 2/1932 | Byrnes | 165/9.3 |
| 1,914,956 | 6/1933 | Naismith et al. | 432/165 |
| 1,941,411 | 12/1933 | Mulholland | 158/2 |
| 1,943,957 | 1/1934 | Godard | 263/15 |
| 2,010,064 | 8/1935 | Drake | 65/347 X |
| 2,068,924 | 1/1937 | Mulholland | 65/347 X |
| 2,069,542 | 2/1937 | Soubier | 432/54 |
| 2,085,811 | 7/1937 | Loftus | 263/15 |
| 2,101,817 | 12/1937 | Morton | 263/19 |
| 2,114,744 | 4/1938 | McBurney | 432/54 |
| 2,179,848 | 11/1939 | Forter | 263/15 |
| 2,300,426 | 11/1942 | Longenecker | 49/54 |
| 2,328,917 | 9/1943 | Longenecker | 263/15 |
| 2,336,993 | 12/1943 | Luetscher | 263/15 |
| 2,351,661 | 6/1944 | Carter et al. | 432/181 |
| 2,494,816 | 2/1950 | Kling | 165/9.3 |
| 2,543,367 | 2/1951 | Henry | 263/52 |
| 2,726,855 | 12/1955 | Lail | 165/9.3 |
| 2,785,212 | 3/1957 | Begley | 260/679 |
| 2,813,708 | 11/1957 | Frey | 165/9.3 |
| 2,994,519 | 8/1961 | Zellers, Jr. | 432/54 |
| 3,170,679 | 2/1965 | Keefer | 263/15 |
| 3,912,485 | 10/1975 | Green | 65/136 |
| 4,047,560 | 9/1977 | Tsai | 165/9.3 |
| 4,088,180 | 5/1978 | Tsai | 165/1 |
| 4,298,372 | 11/1981 | Stover et al. | 65/136 |

FOREIGN PATENT DOCUMENTS

| | | | |
|---|---|---|---|
| 52959 | 1/1922 | Sweden | 432/180 |
| 420541 | 7/1933 | United Kingdom | 432/180 |

OTHER PUBLICATIONS

Manufacturing Program Z & J, Zimmermann & Jansen Inc., Pittsburgh, Pa., 11/13/69.

Manufacturing Programmme Z & J, Z & J Inc., Pittsburgh, Pa., 3/17/77.

Glass-Melting Tank Furnaces, by R. Gunther Society of Glass Technology, Sheffield, 1958, pp. 100–106.

*Primary Examiner*—Albert W. Davis, Jr.
*Attorney, Agent, or Firm*—Hugh A. Kirk

[57] ABSTRACT

Separate intake air and exhaust gas manifolds along each long checker-brick regenerator, each of which manifolds have separate adjustable sideports, valves, or gates in each branch duct that do not have to be readjusted each regeneration cycle, and which gates may be preadjusted and/or at-will adjusted from a common and even remote location.

17 Claims, 2 Drawing Sheets

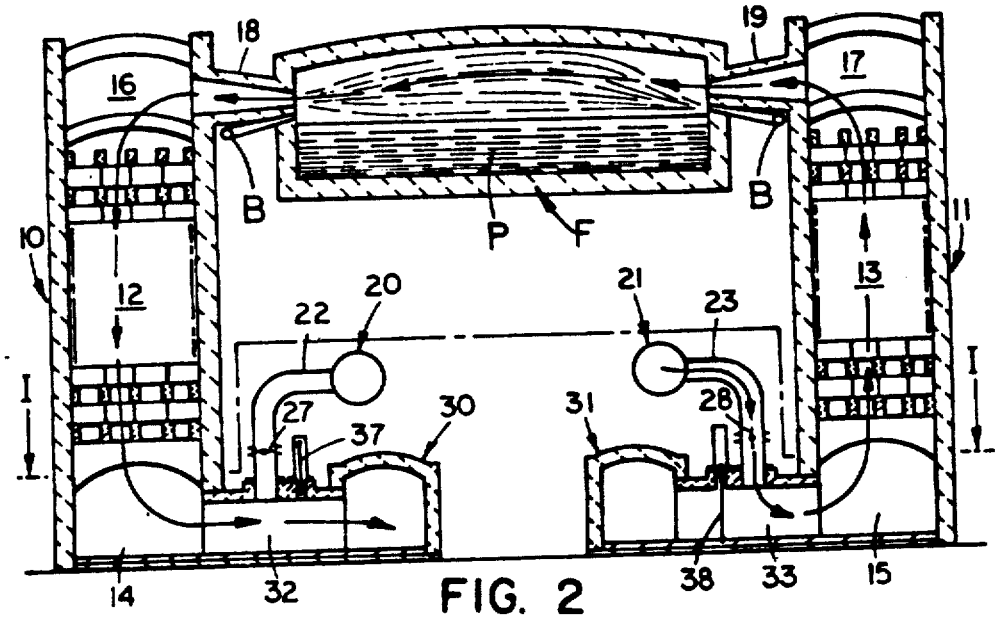
FIG. 2
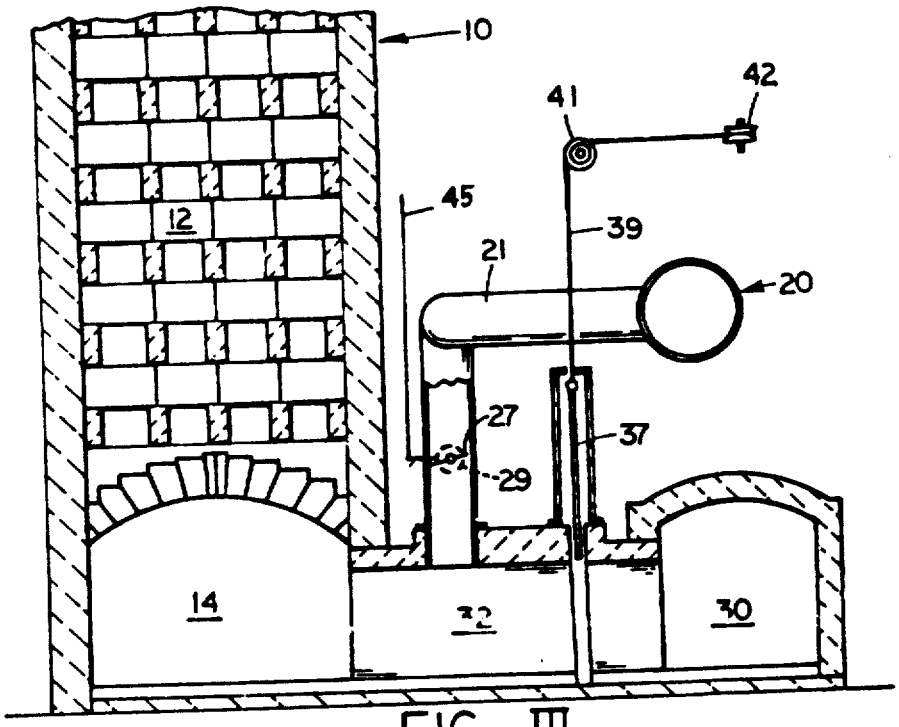
FIG. III

MANIFOLD INPUTS AND OUTPUTS FOR FURNACE REGENERATORS

Matter enclosed in heavy brackets [ ] appears in the original patent but forms no part of this reissue specification; matter printed in italics indicates the additions made by reissue.

BACKGROUND OF THE INVENTION

Usually previously, the intake air and the exhaust gases were introduced and removed from the end of a long tunnel underneath the checker brickwork of the regenerators along each side of a long hearth-type of furnace such as a glass furnace. The air and gases thus took any path of least resistance up or down through the checker brickwork which resulted in the uneven distribution of temperature throughout the brickwork producing hot and cold spots at different locations along the long regenerators. This, however, produced an uneven combustion and temperature along the furnace, as well as required additional amounts of fossil fuel to be injected into the air at the cooler spots to produce the desired heat in the furnace.

It is known to place vertical partitions at spaced intervals along the brickwork and/or to provide gates at either the top and/or bottom of the brickwork at the openings from the ducts to and from the brickwork as shown for example in Smythe U.S. Pat. No. 478,767 issued July 12, 1892 and McBurney U.S. Pat. No. 2,114,744 issued Apr. 19, 1938. Thus the tunnel under the checker brickwork of the regenerators could be considered in effect a manifold and the purposes of these gates were either to shut off a section for the replacement of its brickwork during operation of the rest of the regenerator, or to control the temperature of the regenerator as a whole. However, intake air and combustion gases both passed through the same tunnel and the same gates to and from these regenerators and the adjustment of the gates for distributing intake air usually is not the same as that required for the exhaust gases. Thus the most effective, efficient and uniform heating and cooling of the regenerators can not be obtained by the construction of the ducts to the checker brick regenerators known in the prior art, and the best and most economic use of the fossil fuels for firing these furnaces through such regenerators is not gained. Furthermore, if these prior art gates were used, the accumulation of batch carryover material thereon would require excessive maintenance and eventually would make these gates immovable.

SUMMARY OF THE INVENTION

Generally speaking, the multiple sideport regenerative system for fossil fuel-fired furnaces of this invention is specifically adapted to open-hearth-type furnaces, such as for glass, which are rather long and have on each side thereof long parallel vertical regenerators of checker brickwork. These regenerators have tunnels along their bottoms under the checker brickwork for the flow of gases to and from the checker brickwork. Into the sides of these tunnels, after their ends have been closed, are connected the separately-valved branches of the separate intake air and exhaust gas manifolds of this invention. The input to the two intake air manifolds are connected to a first reversing valve means, and the output from the two exhaust gas manifolds are connected to a second reversing valve means. Thus, when intake air is introduced into the regenerator on one side of the furnace for heating the air in the brickwork to provide hot air for the burners along the top of the furnace adjacent the outlets from that regenerator, the combustion gases from these burners are removed from the furnace to the top of the checker brickwork of the other regenerator along the other side of the furnace, and removed through the manifold for the exhaust gases connected along the side of the tunnel below that other regenerator checker brickwork. Then after the one regenerator has its brickwork cooled and the other has its brickwork heated, the flow of air and gases is reversed, and the burners along opposite parallel sides of these furnaces are correspondingly switched on and off. These manifolds may be placed outside the regenerators or under the furnace in order to save space, and the separately-valved branch ducts of the input manifolds may be joined in some or all locations along the tunnels with the valved branch ducts for the exhaust gases, thereby reducing the number of side ports in these tunnels. Each of these valves, gates, or dampers are preferably remotely controlled, either by servo motors at each of the valves or by cables, levers and/or other mechanical means having control connections extending to a central or common location, such as at one end of the furnace where the operator for the furnace may easily vary the adjustment of each valve as the thermocouples or sensors in the brickwork and furnace indicate in order to maintain the desired distribution of heating and cooling throughout the regenerators and the associated zones of the furnace. Thus, if one end of the furnace is to be warmer than that of the other, this can easily be controlled by the regulation of the valves in the branch ducts of the four manifolds involved.

Also, if desired, vertical partitions may be placed in the brickwork between some or all of the branch ducts to restrict and/or direct the paths of the air and gases through the checker firebrick of the regenerators. However, such partitions are not necessary in that the separate valving of the branch ducts of the manifolds of this invention can adequately control the distribution of the air and gases vertically through the checker bricks of each of the regenerators.

OBJECT AND ADVANTAGES

Accordingly, it is an object of this invention to produce an efficient, effective, economic, simple system for the passage of gases through the regenerators of fossil fuel-fired furnaces to produce better combustion of the fuels, reduce the fuel consumption, provide uniform and more heat in the furnace, avoid cool and hot spots in the brickwork, particularly at the exit ends of the brickwork of the regenerators, produce a higher flame temperature, obtain a maximum output from the furnace, and a larger utilization life for the regenerators.

Another object is to produce such a system for regeneration of the gases for and from fossel fuel-fired furnaces which is tremendously versatile and flexible and can compensate for plugged-up brickworks in the regenerator, save energy and fuel, produce cooler exhaust gases which are easier to purify and are sufficiently cooled so that they can be introduced directly into electrostatic precipitators and/or other such purifying devices without requiring the prior passage through coolers, thus further reducing the amount of energy required for operating the furnace.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I is a plan view of the manifolds for the inlet air and exhaust gases to a pair of regenerators for a fossil fuel-fired furnace with the upper parts of the regenerators and the furnace removed, namely sectioned along line I—I of FIG. II;

FIG. II is a vertical sectional view taken along line II—II of FIG. I of an open-hearth-type glass furnace showing the two separate regenerators of checker brickwork, the furnace filled with a pool of molten glass and the arrows showing the flow of gases through the checkerwork during one part of the cycle, including cross-sections of the separate intake air and exhaust gas manifolds connected to the tunnels below the brickwork of each regenerator; and FIG. III is an enlarged sectional view taken along line III—III of FIG. I, or of the lower lefthand corner of FIG. II, showing the separate valves in the branch ducts of the intake air and exhaust gas manifolds connected to the bottom of a regenerator.

DETAILED DESCRIPTION OF PREFERRED EMBODIMENT

I. Prior Art Regenerator System

Figure 1:
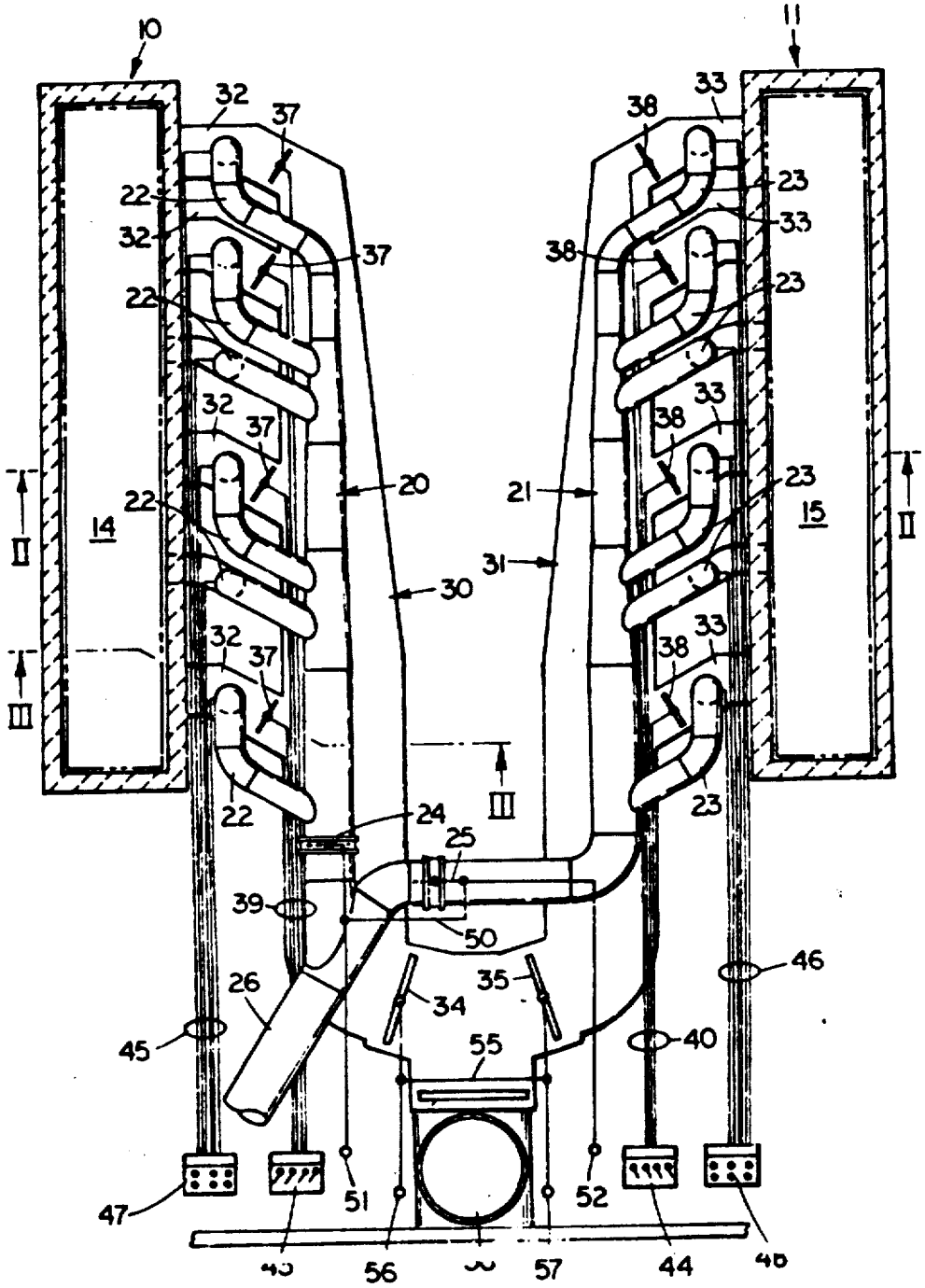

The regenerators 10 and 11 shown in the present embodiment comprise two parallel vertical and long chambers filled with checker brickwork 12 and 13, with longitudinal ducts or tunnels 14 and 15, respectively, along the bottoms and similar longitudinal ducts 16 and 17 along their tops. These top ducts 16 and 17 are connected by a plurality of side ducts 18 and 19, respectively, to the sides of an open-hearth-type of furnace F having rows of burners B along opposite sides thereof adjacent the ducts 18 and 19 and have the pool P of the material or glass melted by the combustion of the fuel from one side row of burners B at a time in the presence of the heated intake air from the adjacent regenerator 11 as shown in FIG. II. This heated air and burning fuel in the furnace F above the pool P forms hot combustion gases which are withdrawn through the ducts 18 into the regenerator 12. The heat-resistant and absorbing checker brickwork 12 in the regenerator 10 is heated by these combustion gases, and then after this brickwork 12 is sufficiently hot, the flow through the regenerators 10 and 11 and furnace F is reversed from that shown in FIG. II. Now the intake air is heated and simultaneously cools the bricks 12 and the heated combustion gases heat up the bricks 13 in the other regenerator 11 and simultaneously cool these combustion gases.

Previously the intake air and combustion gases were introduced and withdrawn, respectively, from the ends of the tunnels 14 and 15 to each of which ends was connected a valved duct which alternately connected the intake air duct and the exhaust gas duct to each tunnel. The exhaust gas duct then usually led to a natural draft or mechanical draft stack through which the waste gases were exhausted into the atmosphere. The introduction of the cool air and removal of the exhaust gases at the ends of the tunnels 14 and 15 without further direction of the air and gases vertically through the brickwork 12 and 13 produced hot and cold spots in the brickwork, often in different locations for the different directions of passage of the air and gases through the regenerators 10 and 11. Usually most of the air and gases passed through the brickwork 12 and 13 nearest the inlet or exhaust end of the tunnel and comparatively lesser amounts of the air and gases passed through the brickwork at the farther closed end of the tunnel.

In order to avoid these irregularities and to produce more uniform and efficient operating regenerators and furnaces, and more economic use of the fuels, the system of this invention has been developed for accurately controlling the passage of air and gases through such regenerators.

II. The Invention

Referring first to FIG. I there is shown a pair of intake manifold ducts 20 and 21, each having a plurality of branch ducts 22 and 23, respectively, and at their larger input ends there are provided separate valve means 24 and 25 for alternately connecting these manifolds 20 and 21 to the main air inlet pipe 26. Each of the branch ducts 22 and 23 is provided with a separate gate 27 and 28 (see FIGS. II and III), which herein is shown to be in the form of a damper that may be adjusted and operated, manually and/or automatically, by any suitable means, herein shown to be an electric motor 29 (see FIG. III).

Also shown in FIG. I are a pair of exhaust gas manifold ducts 30 and 31, each having a plurality of branch ducts 32 and 33, respectively, and at their larger exit ends there are provided valve means 34 and 35 for alternately connecting these manifolds 30 and 31 to the common outlet duct 36 which may be connected to an electrostatic precipitator or any other purifying equipment or system for removing any particles that remain in the cooled exhaust gases. Thence these exhaust gases are passed to an exhaust gas moving system such as a natural draft stack, an ejector, or an exhaust fan. Each of the branch ducts 32 and 33 are provided with separate adjustable gate means 37 and 38 respectively, which are separately operative and adjustable, manually and/or automatically, either by means of cables, hydraulic mechanisms, motors, or the like.

These branch ducts 22, 23, 32 and 33 are distributed along a side of the tunnels 14 and 15 of the regenerators 10 and 11 and are connected separately or together into spaced apertures in and along the sides of the tunnels 14 and 15 after the ends of the tunnels 14 and 15 have been closed.

If desired, cross or transverse partitions may be placed in the tunnels 14 and 15 between the connections of the branch ducts 22, 23, 32 and 33. However, since the branch input and output ducts are often differently located as shown in FIG. I, this is not necessary. Furthermore, certain of the partitions may be extended up through the checker brickwork in the regenerators. An advantage of the present system is that it may be adapted to an already existing system and may be installed without even shutting down the furnace.

In FIGS. I and III the valves 37 and 38 are shown to be operated by separate cables 39 and 40 over pulleys 41 and 42, which cables 39 and 40 may be all led to remote control panels 43 and 44 for each recuperator 10 and 11, respectively, as shown in FIG. I.

Similarly, the connections to each of the motors 29 for the separate gate means 27 and 28 on each of the input manifold duct branches 22 and 23 may similarly be connected via electric control conductors or wires 45 and 46, respectively, (see FIG. I) to corresponding control panels or pushbuttons 47 and 48 which may be located adjacent the panels 43 and 44, respectively.

Furthermore, the intake air reversing valve means 24 and 25 may be interconnected by schematically shown means 50 to controls 51 and/or 52 adjacent the panels 43 and 44. Likewise, the reversing valve means 34 and 35 for the exhaust gas manifolds 30 and 31 may be connected together by the schematically shown means 55 to control means 56 and 57 also adjacent the controls 51 and 52. If desired, these reversing valve means may be operated automatically according to the relative temperatures sensed in the regenerators 10 and 11.

It is important that the valves or gates 27, 28 and 37, 38 need not be adjusted each time that the air and exhaust gases are reversed through the regenerators 10 and 11. These gates usually are preset so as to uniformly distribute the air and gases passing through the checker brickworks 12 and 13, which settings are often different for the intake air duct valves 27 and 28 than for the exhaust gas duct valves 37 and 38. Once these gates or valves 27, 28, 37 and 38 have been set to produce uniform heating and cooling in each cycle of the operation of the regenerators, they do not have to further be adjusted unless there occurs some unexpected variation in the furnace and/or regenerators requiring such an adjustment. Also, these valves 27, 28, 37 and 38 may be constantly modulating automatically controlled valves without departing from the scope of this invention. Thus, the versatility of this system for maintaining a uniform distribution of heat transfer through the regenerators 10 and 11 is infinite, and the most efficient type of operation and fuel consumption can be accomplished by this system.

It is also to be understood that other types of regenerators then the checker brick type shown herein may be adapted by the valved branch duct manifold system of this invention without departing therefrom, and that it may also be adapted to other types of heaters and furnaces than glass furnaces, wherein conservation of fossil fuels is important.

While there is described above the principles of this invention in connection with specific apparatus, it is to be clearly understood that this invention is made only by way of example and not as a limitation to the scope of this invention.

We claim:

1. A regenerator system for [a] *an open hearth type* furnace (*F*) having a pair of elongated *unpartitioned* regenerators (*10, 11*) through which intake air and exhaust gases alternately pass, and each said [generator] *regenerator* having *in order from the bottom to the top, a tunnel* (*14, 15*), *brickwork* (*12, 13*) *and* a longitudinal *open* duct (*16, 17*) along its top connected to a plurality of side ports (*18, 19*), said system *further* comprising:

(A) an input manifold (*20, 21*) for [said] *each regenerator for feeding* intake air [to each regenerator,] *thereto, each* said *input* manifold having branch ducts (*22, 23*) spaced along and connected to its said [regenerators] *regenerator tunnel* (*14, 15*), (B) an output manifold (*30, 31*) for *each regenerator, separate from said input manifold, for removing* exhaust gases [from each regenerator,] *therefrom, each* asid *output* manifold having branch ducts (*32, 33*) spaced along and connected to its said regenerator *tunnel* (*14, 15*), (C) *a* separately operative [gates] *gate* (*27, 28, 37, 38*) in each of said branch ducts, and (D) separate reversing valve means (*24, 25, 34, 35*) between said input manifolds and between said output manifolds,

*whereby, said gates in said input and output manifold branch ducts may be separately adjusted and maintained without change when said reversing valve means are operated to effect different flows of air and exhaust gases in opposite directions through said regenerators to insure even distribution of heat and cooling of said brickwork throughout the unpartitioned regenerators and to compensate for asymmetry between said regenerators while insuring that the whole of their available regenerator brickwork is used, irrespective of whether one or more of the ports from the regenerator into the furnace is blocked, thus avoiding dead spaces in the regenerator.*

[2. A regenerator system according to claim 1 wherein said manifold ducts are tapered from one end to the other along the connections to their branch ducts.]

[3. A regenerator system according to claim 1 wherein said regenerators are of the checker brick type having tunnels under each of their brickworks, and said manifolds are connected along the sides of said tunnels.]

[4. A regenerator system according to claim 1 wherein each of said gates is separately adjusted without change when said reversing valve means are operated.]

5. A regenerator system according to claim 1, *further* including means (*39, 40, 45, 46*) for operating all of said gates from a remote location (*43, 44, 47, 48*).

6. A regenerator system according to claim 1 wherein some of said branch ducts of said intake manifold are connected to branch ducts of said [exhaust] *output* manifold.

7. A regenerator system according to claim [3] *1*, wherein each said tunnel is provided with multiple sideports [for connection] *connected* to [said] *respective* branch ducts of said manifolds.

8. A regenerator system for [a] *an open hearth type* furnace (*F*) having a pair of elongated *unpartitioned* regenerators (*10, 11*) through which intake air and exhaust gases [pass as these gases are] alternately [passed] *pass*, each regenerator having: (a) an elongated *open* duct (*16, 17*) along its top connected to a plurality of sideports (*18, 19*) connected to said furnace, [and] (b) *brickwork* (*12, 13*) *underlying said elongated open duct, and* (*c*) a tunnel (*14, 15*) *underlying said brickwork* along [its] *the* bottom *of said regenerator* having multiple sideports, said system *further* comprising:

(A) an input manifold (*20, 21*) *for* [said] *each regenerator for feeding* intake air [to each regenerator,] *thereto, each* said input manifold having branch ducts (*22, 23*) spaced along and connected to said tunnel via said *tunnel* sideports, *respectively*, (B) an output manifold (*30, 31*) for *each regenerator, separate from said input manifold, for removing* exhaust gases [from each regenerator] *therefrom*, said output manifold having branch ducts (*32, 33*) spaced along and connected to said tunnel via said *tunnel* sideports, *respectively*, (C) *a* separately operative [gates] *gate* (*27, 28, 37, 38*) in each of said branch ducts of both said manifolds, and (D) separate reversing valve means (*24, 25, 34, 35*) between said input manifolds and between said output manifolds,

*whereby, said gates in said input and exhaust manifold branch ducts may be separately adjusted and maintained without change when said reversing valve means are operated to effect different flows of air and exhaust gases in opposite directions through said regenerators to insure even distribution of heat and cooling throughout the unpartitioned regenerators and to compensate for asymmetry between said regenerators while insuring that the whole of the available regenerator brick work is used, irrespective of whether one or more of the ports from the regenerator into the furnace is blocked, thus avoiding dead spaces in the regenerator.*

[9. A system according to claim 8 wherein said gates are separately adjusted without change when said reversing valve means are operated.]

10. A regenerator system according to claim 8 including means for operating all said gates from a remote location.

11. A regenerator according to claim 8 wherein some of said branch ducts of said intake manifold are connected to the branch ducts of said [exhaust] *output* manifold.

*12. A method for producing a more uniform and efficient operation of two unpartitioned regenerators (10, 11) for an open hearth type furnace (F) by separately controlling the passage of gases through said two regenerators and furnace in each direction, comprising:*

*a) distributing the intake gases to a plurality of inlets (22, 23) along a side of each regenerator,*

*b) removing the outlet gases from a plurality of outlets (32, 33) along a side of each regenerator, and*

*c) separately adjusting the flow (27, 28, 37, 38) of the intake and outlet gases in each inlet and outlet along the sides of said regenerators,*

*whereby the flow distribution and selection of gases through said two regenerators and furnace in one direction is different from the flow distribution and selection of gases through said two regenerators in the opposite direction.*

*13. A regenerator system for an open hearth type furnace (F) having a pair of elongated unpartitioned regenerators (10, 11) through which intake air and exhaust gases alternately pass, and each said regenerator having a longitudinal open duct (16, 17) along its top connected to at least one port (18, 19) in said furnace, brickwork (12, 13) underlying said longitudinal open duct and a tunnel (14, 15) underlying said brickwork, said system further comprising:*

*A) an input manifold (20, 21) for each regenerator for feeding intake air thereto, each said input manifold having branch ducts (22, 23) spaced along and connected to its said regenerator tunnel (14, 15),*

*B) an output manifold (30, 31) for each regenerator, separate from said input manifold, for removing exhaust gases therefrom, each said output manifold having branch ducts (32, 33) spaced along and connected to its said regenerator tunnel (14, 15),*

*C) a separately operative gate (27, 28, 37, 38) in each of said branch ducts,*

*D) separate reversing valve means (24, 25, 34, 35) between said input manifolds and between said output manifolds, and*

*E) said manifolds extending along the sides of said tunnels and being connected to said tunnels via said branch ducts;*

*whereby, said gates in said input and exhaust manifold branch ducts may be separately adjusted and maintained without change when said reversing valve means are operated to effect different flows of air and exhaust gases in opposite directions through said regenerators to insure even distribution of heat and cooling throughout the unpartitioned regenerator and to compensate for asymmetry between said regenerators while insuring that the whole of their available regenerator brick work is used.*

*14. A regenerator system according to claim 13 including means for operating all of said gates from a remote location.*

*15. A regenerator system according to claim 13 wherein some of said branch ducts of said intake manifold are connected to branch ducts of said output manifold.*

*16. A regenerator system according to claim 13 wherein each said tunnel is provided with multiple sideports for connection to said branch ducts of said manifolds.*

*17. A regenerator system for an open hearth type furnace (F) having a pair of elongated unpartitioned regenerators (10, 11) through which intake air and exhaust gases alternately pass, each regenerator having: (a) an elongated open duct (16, 17) along its top connected via at least one port (18, 19) to said furnace, (b) a tunnel (14, 15) along its bottom having multiple sideports, and (c) brickwork (12, 13) above said tunnel (14, 15) and below said elongated open duct (16, 17), said system further comprising:*

*A) an input manifold (20, 21) for each regenerator for feeding intake air thereto, said input manifold having branch ducts (22, 23) spaced along and connected to said tunnel via said sideports,*

*B) an output manifold (30, 31) for each regenerator, separate from said input manifold, for removing exhaust gases therefrom, said output manifold having branch ducts (32, 33) spaced along and connected to said tunnel via said sideports,*

*C) a separately operative gate (27, 28, 37, 38) in each of said branch ducts of both said manifolds, and*

*D) separate reversing valve means (24, 25, 34, 35) between said input manifolds and between said output manifolds,*

*whereby, said gates in said input and exhaust manifold branch ducts may be separately adjusted and maintained without change when said reversing valve means are operated to effect different flows of air and exhaust gases in opposite directions through said regenerators to insure even distribution of heat and cooling throughout the unpartitioned regenerator and to compensate for asymmetry between said regenerators while insuring that the whole of their available regenerator brick work is used, irrespective of whether one or more of the ports from the regenerator into the furnace is blocked, thus avoiding dead spaces in the regenerator.*

*18. A regenerator system according to claim 17 including means for operating all of said gates from a remote location.*

*19. A regenerator according to claim 17 wherein some of said branch ducts of said intake manifold are connected to the branch ducts of said output manifold.*

*20. A regenerator system for an open hearth-type furnace (F) having a pair of elongated unpartitioned regenerators (10, 11) through which intake air and exhaust gases alternately pass, each said regenerator having a longitudinal open duct (16, 17) along its top connected to at least one port (18, 19) in said furnace, brickwork (12, 13) underlying said longitudinal open duct and a tunnel (14, 15) underlying said brickwork, said system further comprising:*

*(A) a first manifold (20, 21) for each regenerator extending along the side of said regenerator, each said first*

*manifold having an open end and branch ducts (22, 23) spaced along said first manifold and being connected at opposite ends respectively to said first manifold and to said regenerator tunnel (14, 15),*

*(B) a second manifold (30, 31) for each regenerator extending along the side of said regenerator, separate from said first manifold, each said second manifold having an open end and branch ducts (32, 33) spaced along said second manifold and being connected at opposite ends of said branch ducts respectively to said second manifold and to its said regenerator tunnel (14, 15),*

*(C) a separately operative gate (27, 28, 37, 38) in each of said branch ducts, and*

*(D) valve means (24, 25, 34, 35) for alternately passing intake air to one regenerator and exhaust gas from the other regenerator, and vice versa, said valve means comprising a valve at said open end of each said manifold, whereby, said gates in said first and second manifold branch ducts may be separately adjusted and maintained without change when said valve means are operated to effect different flows of air and exhaust gases through said regenerators to effect more even distribution of heat and cooling throughout the unpartitioned regenerators.*

*21. A regenerator system according to claim 20 wherein each said regenerator has a plurality of ports along its top connected to said furnace.*

* * * * *